Dec. 1, 1936.  E. B. ROTHWEILER  2,062,826
PISTON SPREADER
Filed April 28, 1934
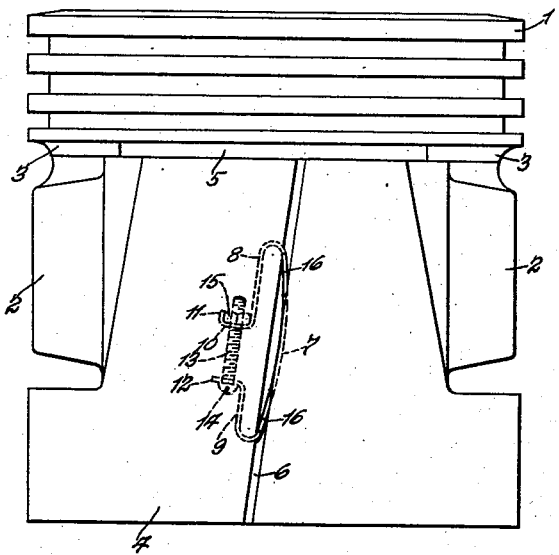
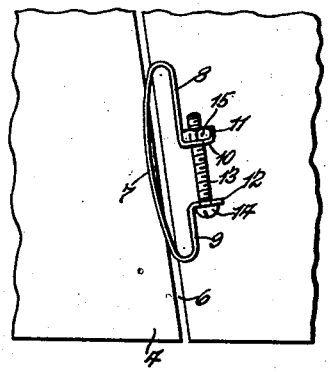
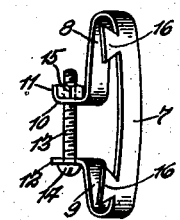
Inventor
Edward B. Rothweiler
by Rippey & Kingsland
His Attorneys Patented Dec. 1, 1936

2,062,826

UNITED STATES PATENT OFFICE 2,062,826

PISTON SPREADER

Edward B. Rothweiler, St. Louis, Mo.

Application April 28, 1934, Serial No. 722,923

10 Claims. (Cl. 309—12)

This invention relates to piston spreaders.

An object of the invention is to provide a device for use in connection with split pistons, including portions adapted to be extended into the slot in the piston skirt, and means in connection with said parts for imparting twisting or inclining movements thereto in order to spread the piston skirt to compensate for wear on the piston skirt or the cylinder wall in which the piston operates.

Another object of the invention is to provide a piston spreader comprising a strip of resilient metal having laterally extended portions adapted to extend into a slot in a piston skirt and also having laterally extended portions adapted to be engaged by a screw device, which is operative to twist or incline the parts that extend into the slot in the piston skirt and thereby spread the skirt.

Other objects of the invention should be readily apparent from the following description, reference being made to the annexed drawing, in which—

Fig. 1 is a side elevation of a split piston having my improved piston spreader in connection therewith.

Fig. 2 is a fragmentary view showing the inside of the piston skirt and the piston spreader connected therewith.

Fig. 3 is a perspective view of the piston spreader apart from the piston.

The piston, in connection with which the invention is shown, is of a familiar type, including a head 1 supporting diametrically opposite piston pin bosses 2 which are integrally united with the head by connecting portions 3. A skirt 4 is supported by the piston pin bosses 2 and has its upper end separated from the cylindrical portion of the head 1 by a space or slot 5. The skirt 4 is formed with a slot 6 extending from the lower end of the skirt to the space or slot 5 approximately midway between the bosses 2 at one side of the skirt.

The present invention comprises a strip of resilient metal, such as steel, shaped to provide an arcuate portion 7 having its ends 8 and 9 bent and extended toward each other. The end 8 has an outwardly extended part 10 with the marginal portion 11 thereof bent and extended in a direction away from the end 8. The terminal portion 12 of the end 8 extends outwardly approximately parallel with the outwardly extended portion 10. The parts 11 and 12 are provided with holes through which a screw or bolt 13 extends, the head 14 of said screw or bolt seating against the outwardly extended part 12. A nut 15 is seated against the outwardly extended part 10 between the end portion 11 thereof and the part 8 and is thereby locked or held from turning. Thus, when the screw or bolt 13 is screwed into the nut 15, the latter will be held from turning while the screw is free to operate.

The arcuate portion 7 is formed with a pair of spaced lateral extensions 16 which are of increasing width from their connection with one side of the arcuate portion 7 to their outer ends. These extensions are designed and adapted to be placed in the slot 6 and then twisted or inclined by screwing the screw or bolt 13 into and through the nut 15 to reduce the radius of curvature of the arcuate portion 7. Obviously, when the curvature of the arcuate portion 7 is modified in this way by tightening the screw 13, the parts 16 are twisted or inclined, with the result that the split skirt of the piston is spread or enlarged. The edges of the extensions 16 indent the walls of the slot 6 sufficiently to obtain rigid hold and to prevent the device from slipping during operation of the piston. Moreover, this cutting-in effect of the extensions 16 into the walls of the slot 6 may be increased as the piston operates in the cylinder.

This device may be manufactured and sold at comparatively low cost and is strong and durable and cannot become dislodged or displaced during operation of the piston.

The formation and dimensions of the device may be varied within the scope of equivalent limits without departure from the nature and principle of the invention.

I claim:

1. A piston spreader comprising a resilient metallic strip adapted to be placed at the inside of a piston having a slot, extensions integral with and extending laterally from the side edge of said strip adapted to extend into said slot in said piston, and means supported by said strip for inclining or twisting all of said extensions against both of the walls of said slot.

2. A piston spreader comprising a resilient metallic strip, outwardly flaring extensions in connection with and extending laterally from the side edge of said strip adapted to engage in the slot of a split piston, and means supported by said strip for inclining or twisting all of said extensions against both of the walls of the piston slot to spread the piston.

3. A piston spreader comprising an arcuate resilient metallic strip, lateral extensions integral with said strip adapted to extend into the slot of a split piston, end portions extending away from said strip, and means supported by said end portions for bending said strip and thereby twisting or inclining said extensions against the walls of the piston slot.

4. A piston spreader comprising a resilient metallic strip, parts on said strip adapted to engage in the slot of a split piston, and means supported by said strip for bending the same and causing the side edges of each of said parts to exert pressure against opposite walls of the piston slot to spread the piston.

5. A piston spreader comprising a resilient metallic strip having a portion extending laterally from one of its side edges adapted to engage in the slot of a split piston, and means supported by said strip for twisting or inclining said portion and forcing its opposite side edge against opposite walls of the piston slot to spread the piston.

6. An expander comprising a member adapted to be inserted in a slot in the skirt of a piston and by turning therein to expand said slot, and means adapted to hold said member in partially turned position with relation to said slot.

7. An expander comprising a tongue adapted to be inserted in a slot in the skirt of a piston and by turning therein to expand said slot, and means adapted to hold said tongue in partially turned position with relation to said slot.

8. An expander comprising a spring provided at one end with a tongue adapted to be inserted in a slot in the skirt of a piston and by turning therein to expand said slot, and means adapted to hold said tongue in partially turned position with relation to said slot.

9. An expander comprising a member adapted to be inserted in a slot in the skirt of a piston and by turning therein to expand said slot, and adjustable means adapted to hold said member at such angle with relation to said slot as may be desired.

10. The combination with a piston having a skirt provided with a slot to permit expansion thereof, of an expander comprising a member adapted to be inserted in said slot and by turning therein to expand said slot, and means adapted to hold said member in partially turned position with relation to said slot.

EDWARD B. ROTHWEILER.